United States Patent Office 2,945,867
Patented July 19, 1960

2,945,867
ANTHRAQUINONE DYESTUFFS

Milton L. Hoefle, David I. Randall, and Edgar E. Renfrew, Easton, Pa., assignors to General Aniline & Film Corporation, New York, N.Y., a corporation of Delaware No Drawing. Filed Dec. 30, 1952, Ser. No. 328,816

3 Claims. (Cl. 260—380)

The present invention relates to the production of dyestuffs of the anthraquinone series and more particularly to unsulfonated compounds having the following general formula:

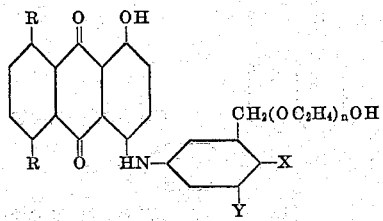

wherein one R stands for $NO_2$ and the other R stands for OH, X is selected from the group consisting of hydrogen, halogen and lower alkyl, Y is selected from the group consisting of hydrogen and —$CH_2(OC_2H_4)_nOH$, and $n$ has a value of 1 to 3.

The need for dyestuffs in the violet blue and green range which are fast to light and to acid gas fumes when applied to cellulose acetate rayon has been long recognized. In the compounds of the formula described above, we have discovered a series of dyestuffs which combine the desirable properties of good substantivity and good light fastness, wash fastness and acid gas fastness. Such dyestuffs are also applicable to materials having a basis of nylon, Dacron, Orlon, Dynel, Acrilan and other polymeric substances.

The dyestuffs of this invention may be prepared readily by condensing a 1,8-dihydroxy-4,5-dinitro or 1,5-dihydroxy-4,8-dinitro anthraquinone with a properly substituted aminobenzene. Catalysts and acid binding agents may be employed if desired, and the reaction may be carried out preferably in the absence of water and in an inert organc diluent.

The above-mentioned properly substituted aminobenzenes, namely, those of the formula

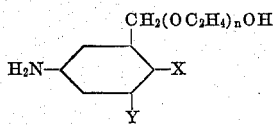

wherein X, Y and $n$ have the values stated hereinbefore, and their method of production, are disclosed and claimed in the copending application of Saul R. Buc and David I. Randall, Serial No. 128,919 filed November 22, 1949, now abandoned.

It will be readily understood that the compounds of the instant invention may be substituted in the benzene nucleus of the 4-benzeneamino substituent and in the 2,3,6 and 7 positions of the anthraquinone nucleus by inert substituents which do not detract from the properties desired in the final dyestuff. In the formula, X may be hydrogen, methyl, ethyl, propyl, Cl, Br, and the like, but preferably hydrogen or methyl, and $n$ preferably has a value of 1.

The following examples serve to illustrate the invention but they are not intended to limit it thereto. Parts are by weight unless otherwise indicated.

Example 1

In a suitable vessel equipped with a stirrer, a heater, a thermometer and a condenser were placed 165 parts 4,5-dinitrochrysazine, 281 parts 2,2'-(4-amino-2,6-tolylenedimethoxy)diethanol and 1,750 parts nitrobenzene. The reaction mixture was maintained at 150° C. for 7½ hours during which time the mixture was stirred. It was allowed to cool and water was added. Steam distillation was then conducted until all of the solvent had been driven over. The residue was isolated by decantation and stirred with 1000 parts warm methanol. The part which was undissolved in the methanol was isolated by filtration and the process repeated twice more. The final residue after drying weighed 300 parts. It has the structure:

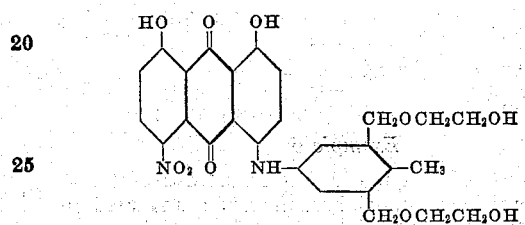

Cellulose acetate dyed with this compound by the usual procedure gave attractive greenish-blue dyeings of very good fastness to washing and to light and exceptionally good fastness to the action of combustion gas fumes.

Example 2

The process of Example 1 was repeated except that 195 parts 2-m-aminobenzyloxyethanol were used in place of the 281 parts 2,2'-(4-amino-2,6-tolylenedimethoxy)diethanol. The dyestuff which resulted has the structure:

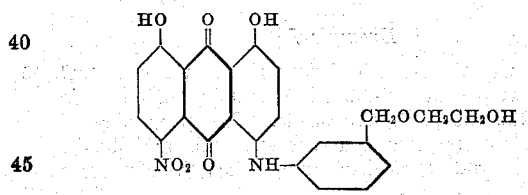

It gave dyeings of essentially the same fastness properties as those of the dyestuff described in Example 1. It was slightly redder in shade.

Example 3

The process of Example 1 was repeated except that 199 parts 2-(5-amino-o-tolylmethoxy) ethanol were used in place of the 281 parts 2,2'-(4-amino-2,6-tolylenedimethoxy)diethanol. The fastness properties of the resulting blue dyestuff were essentially the same as those of the compound described in Example 1, and has the structure:

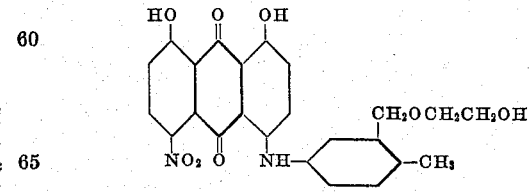

Example 4

The process of Example 1 was repeated except that 234 parts of 2-(2-m-aminobenzyloxyethoxy)ethanol were used instead of the 281 parts 2,2'-(4-amino-2,6-tolylenedimethoxy)diethanol. The resulting dyestuff has substantially the same properties as those of Example 2, and has the structure:

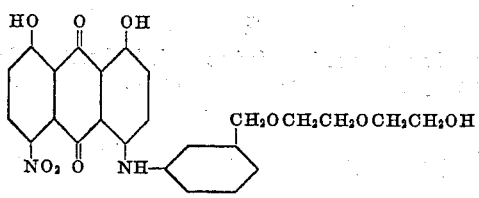

*Example 5*

The process of Example 1 was repeated except that an equal weight of 4,8-dinitroanthrarufin was used in place of the 4,5-dinitrochrysazine. The product was slightly greener than the product of Example 1 and gave dyeings of substantially the same fastness properties. It has the structure:

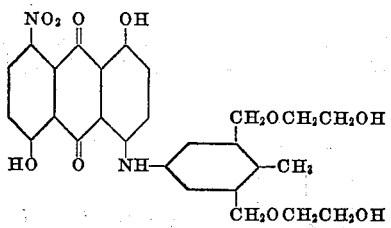

*Example 6*

The process of Example 2 was repeated except that an equal weight of 4,8-dinitroanthrarufin was used in place of the 4,5-dinitrochrysazine. The product was slightly greener than the product of Example 2 and had substantially the same fastness properties. It has the structure:

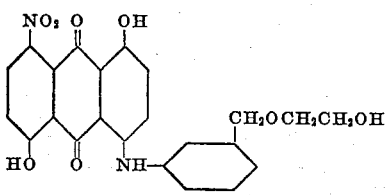

*Example 7*

The process of Example 3 was repeated except that an equal weight of 4,8-dinitroanthrarufin was used in place of the 4,5-dinitrochrysazine. The properties of the products of the two examples were substantially the same. The product of this example has the structure:

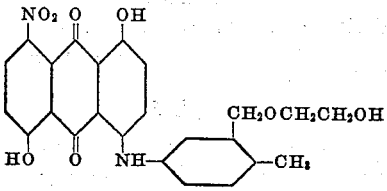

Various modifications and variations of this invention will be obvious to a person skilled in the art and such variations and modifications are to be regarded as within the purview of this application and the spirit and scope of the appended claims.

We claim:

1. A compound of the formula

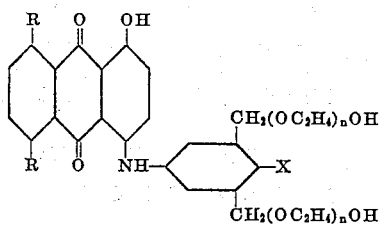

wherein one R stands for $NO_2$ and the other R stands for OH, X is selected from the group consisting of hydrogen, halogen and lower alkyl, and $n$ has a value of 1 to 3.

2. The compound of the formula

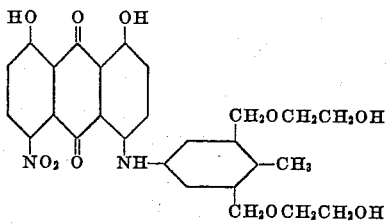

3. The compound of the formula

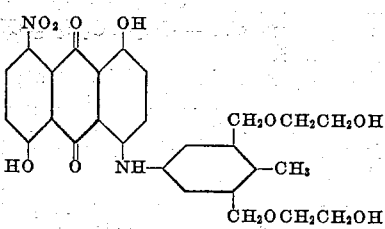

References Cited in the file of this patent

UNITED STATES PATENTS

| | | |
|---|---|---|
| 1,960,564 | Zahn et al. | May 29, 1934 |
| 2,560,887 | Randall et al. | July 17, 1951 |
| 2,585,681 | Randall et al. | Feb. 12, 1952 |
| 2,641,602 | Straley et al. | June 9, 1953 |